UNITED STATES PATENT OFFICE.

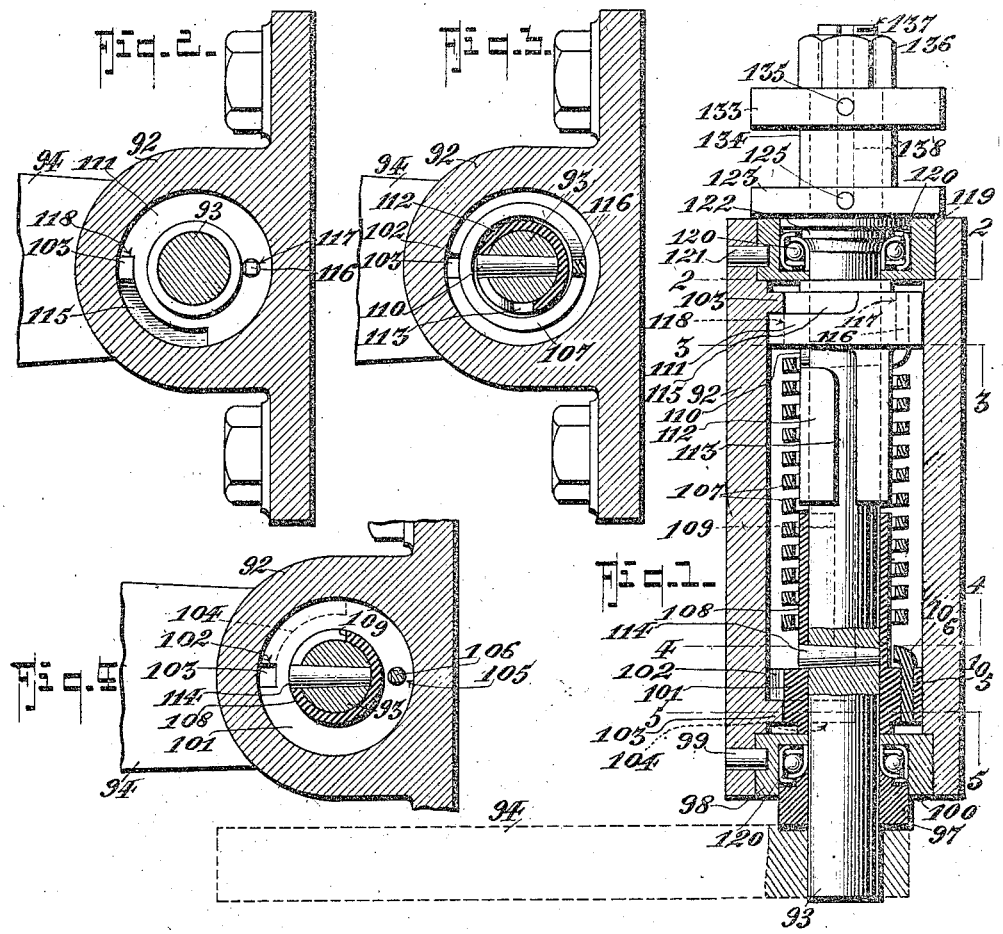
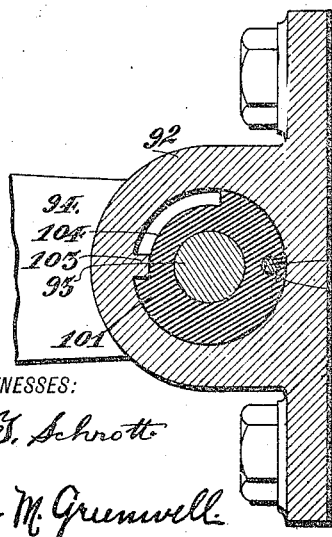

JEAN F. WEBB, JR., OF NEW YORK, N. Y., ASSIGNOR TO THE INTERNATIONAL SIGNAL COMPANY, INCORPORATED, (FORMERLY THE ELECTRIC SIGNAGRAPH & SEMAPHORE CO., INCORPORATED,) OF NEW YORK, N. Y.

BALANCED OSCILLATABLE SHAFT.

1,033,970. Specification of Letters Patent. Patented July 30, 1912.

Original application filed May 6, 1911, Serial No. 625,522. Divided and application filed July 8, 1911, Serial No. 637,482. Divided and this application filed January 18, 1912. Serial No. 671,860.

*To all whom it may concern:*

Be it known that I, JEAN F. WEBB, Jr., residing at New York, in the county of New York and State of New York, have invented certain new and useful Improvements in Balanced Oscillatable Shafts, of which the following is a specification.

The present invention has for its object to provide a yieldable balanced shaft of general application, in which the shaft support includes a chamber for containing the shaft bearings and the yieldable balancing mechanism.

The present invention, while particularly adapted for use in train stopping mechanisms, such as is disclosed, for example, in my co-pending applications filed May 6, 1911, Serial #625522 and July 8, 1911 Serial #637432 (of which applications, the present one is a divisional part,) is nevertheless adapted for a variety of uses, and I do not wish to be understood to limit the invention to any particular use.

The invention furthermore includes those novel details of construction, combination and arrangement of parts, all of which will be first fully described and then be specifically pointed out in the appended claims, reference being had to the accompanying drawings, in which:

Figure 1 is a central, vertical, longitudinal section and part elevation of the invention. Figs. 2, 3, 4, and 5, are horizontal sections taken respectively on the lines 2—2, 3—3, 4—4, and 5—5 of Fig. 1.

By reference to the drawings in which like numerals and letters of reference indicate like parts in all of the figures, it will be seen that 92 designates a cylindrical casing, the ends of which receive bearing plugs 98 and 119 respectively, each of which may be provided with anti-friction bearings 100 and 120 respectively. Projecting through the bearings 100 and 120 and through the casing 92 is a shaft 93.

97 is a bearing cone on the lower end of the shaft 93 to engage the bearing 100.

The bearing plugs 98 and 119 respectively are pinned into position by pins 99 and 121 respectively to be held immovable.

Mounted within the casing 92 on the shaft 93 are two collars 101 and 111 both of which have longitudinal peripheral slots 102 and 118 respectively, and horizontal grooves 104 and 115 respectively to thereby define bayonet slots 102—104 and 118—115 respectively to receive the upper and lower lugs 103—103 on the inner wall of the casing 92. The lower collar 101 has a longitudinal hole 105 to receive one end, 106, of a torsion spring 107, whose other end, 116, projects into a hole 117 in the upper collar 111. Each of the collars 101 and 111 are provided with sleeves 108 and 112 respectively and each of the sleeves is provided with a bayonet slot 109 and 113 respectively.

110 and 114 are pins carried by the shaft 93 to operate in the slots 109 and 113 respectively at times. Mounted near the upper end of the shaft 93 to coöperate with the bearing 120 is a cone 122 that is formed on and forms a part of the rack disk 123. The disk 123 is pinned at 125 to the shaft 93, the pin 125 fitting into the slot 138 in the upper end of the shaft.

A disk 133 is pinned at 135 to the shaft 93 and held spaced from the rack disk 123 by a sleeve 134 on the shaft 93. The upper end of the shaft 93 is reduced and threaded as at 137 to receive the nut 136 that holds the shaft 93 and its carried parts in position.

From the foregoing it will be seen that the shaft 93 is free to turn in either direction for a limited distance and immediately upon release of the same, the spring 107 will restore the shaft to its initial balanced position. The shaft may be turned in any desired way, say by the lever 94 attached thereto, in any manner that may be convenient.

From the foregoing description taken in connection with the accompanying drawings, it is thought the complete construction, operation and advantages of the invention will be clearly apparent to those skilled in the art.

What I claim is:—

1. In an apparatus of the character stated, a casing, bearing members mounted in said casing, a shaft rotatable in said bearing members, a pair of collars having sleeves mounted on said shaft between said bearing members, each of said collars having bayonet slots, lugs on said casing entering said slots, each of said sleeves having bayonet slots, pins on said shaft entering said sleeve bayonet slots, each of said collars having holes, a torsion spring mounted around said sleeves with its end in said collar holes to hold said shaft in a balanced position.

2. A support including a pair of spaced bearings, a shaft mounted in said bearings, a torsional spring mounted on said shaft between said bearings, coöperative connections between said spring, said shaft, and said support, for applying a balanced force to said shaft to retain it in a normal position, said shaft being free to turn in either direction.

3. A casing, a pair of bearings mounted in said casing and spaced apart, a shaft projecting through said casing and said bearings, a pair of sleeves having heads mounted on said shaft and spaced apart, means for holding said heads and sleeves to turn a limited distance in said casing with said shaft, a torsional spring mounted on said sleeves and having its ends engaging said heads to hold said shaft in a balanced position in said casing, means for holding said sleeves to turn a limited distance on said shaft.

4. A support, a shaft mounted therein, a pair of sleeves, a connection between said sleeves and said support, said sleeves having a limited turning movement with relation to said support, a torsion spring having its ends connected to said sleeves and continuously tending to twist them in opposite directions, and connections between said sleeves and said shaft for holding said shaft with provision for limited turning movement between said sleeves and said shaft, substantially as shown and described.

5. A support, a shaft mounted therein, a pair of sleeves, a connection between said sleeves and said support, said sleeves having a limited turning movement with relation to said support, said connections being such that one sleeve will turn one way while the other sleeve will turn in an opposite direction, a torsion spring having its ends connected to said sleeves and continuously tending to twist them in opposite directions, and connections between said sleeves and said shaft for holding said shaft with provision for limited turning movement between said sleeves and said shaft, said last named connections being such that the shaft may have a limited free turning movement with respect to each sleeve.

6. A support, bearings therein, a shaft projecting through said support, members on said shaft, a torsion spring on said shaft with its ends connected respectively to said members, pin and slot connections between said members and said supports, and pin and slot connections between said members and said shaft, whereby said members will have limited turning movement on said shaft and will also have limited turning movement in said support.

7. A support including a pair of spaced bearings, an oscillatable shaft mounted in said bearings, a single torsional spring mounted on said shaft between said bearings, coöperative connections between said spring, said shaft, and said support, for applying a balanced force to said shaft to retain it in a normal position, said shaft being free to turn in either direction against the tension of said spring.

JEAN F. WEBB, Jr.

Witnesses:
JEAN F. WEBB, Sr.,
LORENZO E. THIPLER.